United States Patent
Choi et al.

(10) Patent No.: US 10,558,316 B2
(45) Date of Patent: Feb. 11, 2020

(54) ELECTRONIC DEVICE AND METHOD FOR CONTROLLING SCREEN

(71) Applicant: Samsung Electronics Co., Ltd., Gyeonggi-do (KR)

(72) Inventors: Kyung-Lim Choi, Incheon (KR); Hye-Soon Jeong, Gyeongsangbuk-do (KR); Hui-Chul Yang, Gyeonggi-do (KR); Mi-A Oh, Gyeonggi-do (KR); Wan-Soo Lim, Gyeonggi-do (KR); Bong-Hak Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/125,183

(22) Filed: Sep. 7, 2018

(65) Prior Publication Data

US 2019/0004669 A1  Jan. 3, 2019

Related U.S. Application Data

(63) Continuation of application No. 14/476,175, filed on Sep. 3, 2014, now Pat. No. 10,126,905.

(30) Foreign Application Priority Data

Sep. 3, 2013 (KR) .......................... 10-2013-0105445

(51) Int. Cl.
*G06F 3/0481* (2013.01)
*G06F 3/0488* (2013.01)
(Continued)

(52) U.S. Cl.
CPC .......... *G06F 3/0481* (2013.01); *G06F 3/0482* (2013.01); *G06F 3/0488* (2013.01);
(Continued)

(58) Field of Classification Search
USPC ........................................................ 715/808
See application file for complete search history.

(56) References Cited

U.S. PATENT DOCUMENTS 6,002,397 A    12/1999  Jaaskelainen, Jr.
6,384,840 B1    5/2002  Frank
(Continued)

FOREIGN PATENT DOCUMENTS

EP    0 806 756    11/1997
JP    2006211435    8/2006
(Continued)

*Primary Examiner* — William D Titcomb
(74) *Attorney, Agent, or Firm* — The Farrell Law Firm, P.C.

(57) ABSTRACT

An electronic device includes touchscreen display, and at least one processor configured to display, on touchscreen display, first screen including execution screen of first application, in response to incoming call, display notification of first type indicating occurrence of incoming call on execution screen, wherein at least part of notification of first type is displayed translucently while at least part of execution screen is displayed on touchscreen display, receive first user input for moving notification of first type, in response to first user input, display notification of second type on first screen opaquely, wherein size of notification of second type is smaller than size of notification of first type, and wherein execution screen is not overlapped with notification of second type, receive second user input on notification of second type, and in response to second user input, display second screen indicating occurrence of incoming call on touchscreen display.

12 Claims, 14 Drawing Sheets

(51) Int. Cl.
　　　*G06F 3/0482*　　　(2013.01)
　　　*H04M 1/725*　　　(2006.01)
(52) U.S. Cl.
　　　CPC ............. *H04M 1/72519* (2013.01); *G06F 2203/04101* (2013.01); *G06F 2203/04804* (2013.01)

(56) References Cited

U.S. PATENT DOCUMENTS

| | | | |
|---|---|---|---|
| 6,670,970 | B1 | 12/2003 | Bonura et al. |
| 6,874,126 | B1 | 3/2005 | Lapidous |
| 8,327,440 | B2 | 12/2012 | Milener |
| 8,495,514 | B1 | 7/2013 | Ludolph |
| 9,286,309 | B2 | 3/2016 | Goel |
| 9,329,747 | B2 * | 5/2016 | Roh ............... G06F 3/0481 |
| 9,720,529 | B2 * | 8/2017 | Tae ............... G06F 3/041 |
| 10,126,905 | B2 * | 11/2018 | Choi ............... G06F 3/0481 |
| 2002/0154163 | A1 | 10/2002 | Melchner |
| 2006/0061597 | A1 | 3/2006 | Hui |
| 2008/0034317 | A1 | 2/2008 | Fard |
| 2009/0164936 | A1 | 6/2009 | Kawaguchi |
| 2009/0199127 | A1 | 8/2009 | Sareen et al. |
| 2011/0283226 | A1 | 11/2011 | Basson |
| 2012/0166958 | A1 | 6/2012 | Cramer |
| 2013/0050263 | A1 | 2/2013 | Khoe |
| 2013/0063373 | A1 | 3/2013 | Roh |
| 2013/0094642 | A1 | 4/2013 | Sverdlov |
| 2013/0148720 | A1 | 6/2013 | Rabii |
| 2014/0189532 | A1 | 7/2014 | Sivaraman |
| 2014/0280591 | A1 | 9/2014 | Khandewale |
| 2014/0280660 | A1 | 9/2014 | Khandewale |
| 2014/0359502 | A1 | 12/2014 | Yoon |
| 2015/0242443 | A1 | 8/2015 | Grue |
| 2019/0004669 | A1 * | 1/2019 | Choi ............... G06F 3/0481 |

FOREIGN PATENT DOCUMENTS

| | | |
|---|---|---|
| KR | 10-2005-0081081 | 8/2005 |
| KR | 10-2011-0000076 | 1/2011 |

* cited by examiner

ELECTRONIC DEVICE AND METHOD FOR CONTROLLING SCREEN

PRIORITY

This continuation application claims priority under 35 U.S.C. § 120 to U.S. patent application Ser. No. 14/476,175, which was filed in the U.S. Patent and Tradema Office on Sep. 3, 2014, which claimed priority under 35 U.S.C. § 119(a) to Korean Application Serial No. 10-2013-0105445, which was filed in the Korean Intellectual Property Office on Sep. 3, 2013, the entire contents of each of which is incorporated herein by reference.

BACKGROUND

1. Field of the Invention

The present invention generally relates to an electronic device and a method for controlling a screen.

2. Description of the Related Art

Recently, various services and additional functions provided by an electronic device have gradually expanded. In order to increase an effective value of the electronic device and meet various demands of users, various applications executable by the electronic device have been developed.

Accordingly, at present, a large number of applications can be stored in the electronic device, which is portable and has a touch screen. The electric device includes a smart phone, a mobile phone, a notebook Personal Computer (PC), a tablet PC, and the like. Objects (or shortcut icons) for executing the respective applications are displayed on a screen of the electronic device. Thus, users can execute a desired application in the electronic device, by touching any of the shortcut icons displayed on the screen.

The users may desire to simultaneously perform at least two tasks through the electronic device. Accordingly, in order to satisfy the desire of the users, if an event such as a voice call, a video call, or a text message is received while various applications including a game, the Internet, chatting, and the like are being used, the electronic device needs to simultaneously provide an operation corresponding to the received event and the task being performed by the users prior to the reception of the event.

As described above, according to the related art, if the event is received while the application is being displayed on the screen of the electronic device, the users are provided with only the service for the received event and are not simultaneously provided with the displayed application and the service corresponding to the received event. For example, if an event is received while an arbitrary application is being executed, the electronic device displays a screen corresponding to the received event on the top layer of the screen for acceptance or rejection for the received event, and therefore users cannot continuously perform the task through the previously displayed application and are inconvenienced by obstruction of the task due to such an event.

Thus, when the event is received while the task is being performed through the displayed application, the electronic device needs to provide multi-tasking to the users by displaying the received event in a partial area of the displayed application.

SUMMARY

The present invention has been made to address at least the above problems and disadvantages, and to provide at least the advantages described below. Accordingly, an aspect of the present disclosure is to provide an electronic device and a method for controlling a screen.

In accordance with an aspect of the present invention, an electronic device is provided. The electronic device includes a touchscreen display, and at least one processor, wherein the at least one processor is configured to display, on the touchscreen display, a first screen including an execution screen of a first application, in response to an occurrence of an incoming call, display a notification of a first type indicating the occurrence of the incoming call on the execution screen of the first application, wherein at least part of the notification of the first type is displayed translucently while at least part of the execution screen of the first application is displayed on the touchscreen display, receive a first user input for moving the notification of the first type, in response to the reception of the first user input, display a notification of a second type on the first screen, wherein the notification of the second type is displayed opaquely, wherein a size of the notification of the second type is smaller than a size of the notification of the first type, and wherein the execution screen of the first application is not overlapped with the notification of the second type, receive a second user input on the notification of the second type, and in response to the reception of the second user input, display a second screen indicating the occurrence of the incoming call on the touchscreen display.

In accordance with another aspect of the present invention, a method for controlling an electronic device is provided. The method includes displaying, on a touchscreen display of the electronic device, a first screen including an execution screen of a first application, in response to an occurrence of an incoming call, displaying a notification of a first type indicating the occurrence of the incoming call on the execution screen of the first application, wherein at least part of the notification of the first type is displayed translucently while at least part of the execution screen of the first application is displayed on the touchscreen display, receiving a first user input for moving the notification of the first type, in response to the reception of the first user input, displaying a notification of a second type on the first screen, wherein the notification of the second type is displayed opaquely, wherein a size of the notification of the second type is smaller than a size of the notification of the first type, and wherein the execution screen of the first application is not overlapped with the notification of the second type, receiving a second user input on the notification of the second type, and in response to the reception of the second user input, displaying a second screen indicating the occurrence of the incoming call on the touchscreen display.

In accordance with another aspect of the present invention, an electronic device is provided. The electronic device includes a touchscreen display, and at least one processor, wherein the at least one processor is configured to display, on the touchscreen display, a first screen including an execution screen of a first application, wherein the execution screen of the first application includes a plurality of characters, in response to an occurrence of an incoming call, display a notification of a first type indicating the occurrence of the incoming call on the execution screen of the first application, wherein at least part of the notification of the first type is displayed translucently while at least part of the execution screen of the first application is displayed on the touchscreen display, and wherein at least one character among the plurality of characters is displayed through the translucently displayed notification of the first type, receive a first user input for moving the notification of the first type, in response to the reception of the first user input, display a notification of a second type on the first screen, wherein a size of the notification of the second type is smaller than a size of the notification of the first type, and wherein the execution screen of the first application is not overlapped with the notification of the second type, receive a second user input on the notification of the second type, and in response to the reception of the second user input, display a second screen indicating the occurrence of the incoming call on the touchscreen display.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Figure 1:
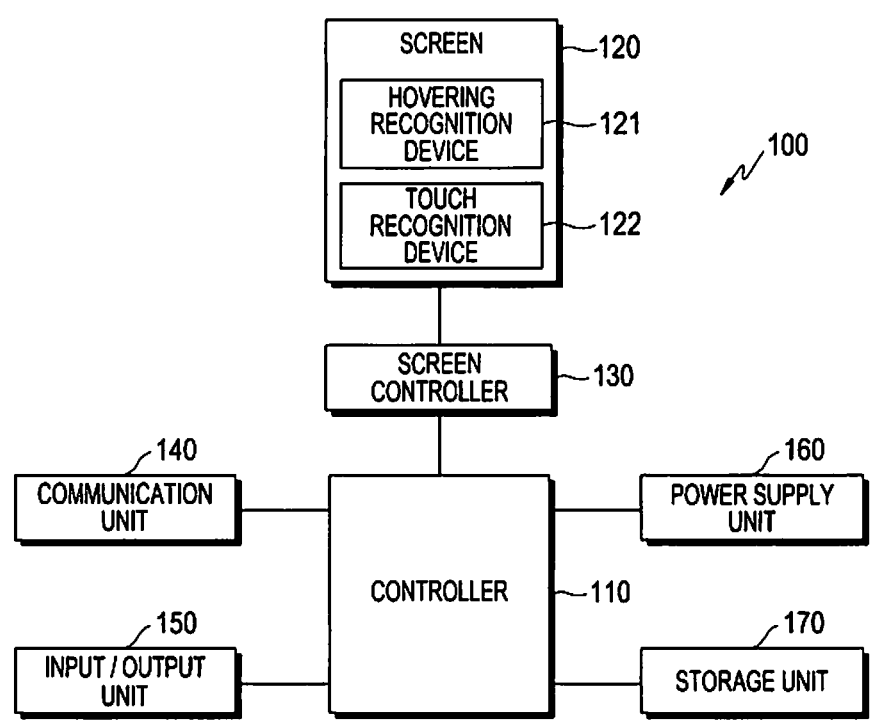
FIG. 1 is a block diagram illustrating an example of an electronic device according to various embodiments of the present invention.

The present invention may have various modifications and embodiments and thus will be described with reference to specific embodiments in detail. Therefore, it should be understood that there is no intent to limit example embodiments to the particular forms disclosed, but on the contrary, example embodiments are intended to cover all modifications, equivalents, and alternatives falling within the scope of the invention.

While terms including ordinal numbers, such as "first" and "second," etc., may be used to describe various components, such components are not limited by the above terms. The terms are used merely for the purpose to distinguish an element from the other elements. For example, a first element could be referred to as a second element, and similarly, a second element could be also referred to as a first element without departing from the scope of the present invention. As used herein, the term "and/or" includes any and all combinations of one or more of the associated listed items.

The terms used herein are merely used to describe specific embodiments, and are not intended to limit the present invention. As used herein, the singular forms are intended to include the plural forms as well, unless the context clearly indicates otherwise. The terms such as "include" and/or "have" may be construed to denote a certain characteristic, number, step, operation, constituent element, component or a combination thereof, but are not to construed to exclude the existence of or a possibility of addition of one or more other characteristics, numbers, steps, operations, constituent elements, components or combinations thereof.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an operation principle for an embodiment of the present invention will be described in detail with reference to the accompanying drawings. Hereinafter, in describing the present invention, detailed descriptions related to well-known functions or configurations will be omitted when they may make subject matter of the present invention unnecessarily obscure. The terms which will be described below are terms defined in consideration of the functions in the present invention, and may be different according to users, intentions of the users, or customs. Accordingly, the terms should be defined based on the contents over the whole present specification.

FIG. 1 is a block diagram illustrating an example of an electronic device according to various embodiments of the present disclosure.

Referring to FIG. 1, the electronic device 100 may be connected with an external device by using at least one of a communication unit 140, a connector, and an earphone connecting jack. The external device may include various devices attached to or detached from the electronic device 100 through a wire, such as an earphone, an external speaker, a Universal Serial Bus (USB) memory, a charger, a cradle/dock, a Digital Multimedia Broadcasting (DMB) antenna, a mobile payment related device, a health management device (blood sugar tester or the like), a game machine, a car navigation device, and the like. Further, the external device may include a Bluetooth communication device, a Near Field Communication (NFC) device, a Wi-Fi Direct communication device, and a wireless Access Point (AC) which can be wirelessly connected. The electronic device may be connected with another device, for example, a mobile terminal, a smart phone, a tablet PC, a desktop PC, a digitizer, an input device, a camera, a server, or the like in a wired or wireless manner.

Referring to FIG. 1, the electronic device 100 includes at least one screen 120 and at least one screen controller 130. Further, the electronic device 100 includes the screen 120, the screen controller 130, the communication unit 140, an input/output unit 150, a power supply unit 160 and a storage unit 170.

The electronic device of the present invention is a mobile terminal that can perform data transmission/reception, a voice call, and a video call, and may include at least one screen. The screen may display a result executed in at least one application. The electronic device includes a smart phone, a tablet Personal Computer (PC), a 3D-TeleVision (TV), a smart TV, a Light Emitting Diode (LED) TV, a Liquid Crystal Display (LCD) TV, a tablet PC, and may includes all devices that can communicate with a peripheral device or another terminal located at a remote place. Further, the at least one screen included in the electronic device may receive an input by at least one of a touch and a hovering event.

The electronic device 100 includes at least one screen 120 providing a user interface corresponding to various services (e.g., a call, data transmission, broadcasting, photographing, a text input, and the like) to a user. The screen may include a hovering recognition device 121 that recognizes an input using hovering of at least one of an input unit and a finger and a touch recognition device 122 that recognizes an input using a touch of at least one of a finger and an input unit. The hovering recognition device 121 and the touch recognition device 122 may be referred to as a hovering recognition panel and a touch panel, respectively. The screen 120 transmits an analog signal corresponding to at least one touch or hovering event input to a user interface to the corresponding screen controller. As described above, the electronic device 100 may include a plurality of screens, and each of the screens may include a screen controller receiving an analog signal corresponding to a touch or a hovering event. The screens may be connected to a plurality of housings through hinge connections, respectively, or the plurality of screens may be located in one housing without the hinge connection. The electronic device 100 according to various embodiments of the present invention may include at least one screen as described above, and one screen will be described hereinafter for convenience of description.

The input unit according to various embodiments of the present invention may include at least one of a finger, an electronic pen, a digital pen, a pen without an integrated circuit, a pen with an integrated circuit, a pen with an integrated circuit and a memory, a pen capable of performing short distance communication, a pen with an additional ultrasonic detector, a pen with an optical sensor, a joystick, and a stylus pen, which can provide a command or an input to the electronic device by contact or non-contact such as hovering on a digitizer.

A controller 110 controls overall operation of the electronic device 100 and the components therein, and may include a Central Processing Unit (CPU), a Read Only Memory (ROM) storing a control program for controlling the electronic device 100, and a Random Access Memory (RAM) used as a storage area for storing a signal or data input from the outside of the electronic device 100 or for work performed in the electronic device 100. The CPU may include a single core, a dual core, a triple core, or a quadruple core.

The controller 110 controls at least one of the screen 120, the hovering recognition device 121, the touch recognition device 122, the screen controller 130, the communication unit 140, an input/output unit 150, a power supply unit 160 and a storage unit 170.

The controller 110 determines whether hovering according to proximity of various input units to any object is recognized and identifies the object corresponding to a location where the hovering has occurred, in a state where various objects or an input text is displayed on the screen 120. The controller 110 may detect a height from the electronic device 100 to the input unit, and may also detect a hovering input event according to the height, in which the hovering input event may include at least one of a push of a button formed in the input unit, a tap on the input unit, a movement of the input unit at a speed higher than a predetermined speed, and a touch on an object.

The controller 110 according to an embodiment of the present invention displays an executed application on the screen 120, and when receiving an event, displays a popup window including at least one piece of information corresponding to the received event on the displayed application. The information included in the popup window may be different according to a type of event. The at least one piece of information is a command previously determined according to the type of event, and a user may control the received event through the predetermined command. For example, when the event corresponds to a voice call or a video call, the information included in the popup window may include at least one of a sender's name, a sender's photo, a sender's phone number, a reception menu for starting the call, a speaker menu for starting the call through a speaker, a rejection message menu for transmitting a message to the sender to inform the sender of a status of not receiving the call, and a rejection menu for rejecting the call. Further, when the received event corresponds to a text message, the information included in the popup window may include at least one of a sender's name, a sender's photo, a sender's phone number, a reply menu for transmitting a reply to the received text, a view menu for viewing the received text, a deletion menu for deleting the received text, and a cancel menu for viewing the received text later. The menus may be basically provided by a manufacturer of the electronic device.

The controller 110 simultaneously displays the executed application and the popup window. The popup window may be displayed on the displayed application while overlapping with the displayed application. The popup window may be adjusted on the screen by at least one of size enlargement, size reduction, and location movement, and may be translucently or opaquely displayed on the displayed application. The controller 110 may enlarge the popup window in response to a command to enlarge the size of the popup window, reduce the popup window in response to a command to reduce the size of the popup window, or change the location of the popup window in response to a command to move the location of the popup window. Further, the controller 110 may simultaneously execute at least one of the size enlargement, the size reduction, and the location movement in response to the at least one command.

The controller 110 may change a display location of data included in the displayed application in response to the adjustment of the popup window. The controller 110 may change an attribute of the popup window in response to at least one of the size enlargement, the size reduction, and the location movement of the popup window, and may change attributes of data of the displayed application corresponding to an area of the attribute changed popup window. The controller 110 may translucently or opaquely display the attribute changed popup window on the displayed application. When the popup window is translucently displayed, the data of the displayed application overlapping with the popup window is translucently displayed. When the popup window is opaquely displayed, data of the displayed application corresponding to an area of the displayed popup window is displayed in the remaining area other than the area without overlapping with the area. The controller 110 may display the data of the displayed application corresponding to the area of the displayed popup window in an area other than the area where the popup window is displayed. When receiving the command to enlarge the size of the popup window, the controller 110 may include additional information of a user having transmitted the event in the enlarged popup window. The controller 110 may include information basically provided corresponding to the received event (e.g., at least one of a sender's name, a sender's phone number, a reception menu, a speaker menu, a rejection message menu, and a rejection menu) and the user's additional information in the enlarged popup window. The additional information includes a sender's personal information (e.g., a sender's birthday, information on a schedule by appointment with a sender, and the like). When the event is received from the sender, the user may be reminded of memories for the sender. The controller 110 may include at least one piece of information in the popup window in correspondence to the enlargement of the popup window. The event may be any one of a voice call, a video call and text reception.

A controller 110 according to another embodiment of the present invention displays an executed application on the screen 120, generates a popup window including at least one piece of information in response to reception of an event, and displays the generated popup window on the displayed application. As described above, 25 the controller 110 simultaneously display the executed application and the popup window on the screen 120. The controller 110 may opaquely or translucently display the popup window on the screen 120 by controlling an attribute of the popup window. The controller 110 may display the popup window such that the popup window overlaps with the executed application, or may display data included in the executed application by moving the data to a location where the data does not overlap with the popup window. The controller 110 may change an attribute of the popup window in response to at least one command for size enlargement, size reduction, and location movement of the popup window, and may superpose and display the attribute changed popup window on the displayed application.

The controller 110 detects at least one command of a touch and a hovering event input for the size enlargement or reduction of the popup window and enlarges or reduces the size of the popup window to a location where the input is completed. The controller 110 adjusts information to be displayed in the enlarged or reduced popup window and displays the adjusted information in the popup window. Further, the controller 110 controls the screen 120 such that data of the displayed application corresponding to an area of the enlarged or reduced popup window is opaquely or translucently displayed. If the command corresponds to a command to enlarge the size of the popup window, the controller 110 enlarges the popup window and includes information contained in the popup window displayed on the screen 120 and additional information of a user having transmitted the event in the enlarged popup window. The controller 110 adjusts a display location of the data included in the displayed application in response to the movement of the popup window. Further, the controller 110 may translucently or opaquely change an attribute of the popup window, and the display location of the data may be determined according to the translucency or opacity of the popup window. When the popup window is translucent, the display location of the data may not be changed and the data may be displayed in a translucent status. Further, when the popup window is opaque, the data may be displayed below the popup window. The application includes an application for displaying a text, and the event includes a voice call.

Further, when reception of an event is detected in a state where at least one application is displayed on the screen 120, a controller 110 according to another embodiment of the present disclosure generates a popup window including at least one piece of information corresponding to the received event and displays the generated popup window on the displayed application. The event may include at least one of a voice call, a video call and a text message. The application may include an application capable of displaying a text such as news. If the received event corresponds to a voice call and a command to perform the voice call through a speaker is input, the controller 110 removes the displayed popup window and performs the voice call while displaying the application. When a command to perform the call through a speaker is input in the various telephone call methods, the controller 110 may terminate or remove the displayed popup window and perform the call while displaying the application shortly before the reception of the event on the screen 120.

When detecting an input by a touch or a hovering event at an arbitrary point on the displayed application, the controller 110 displays the generated popup window at a point other than the detected arbitrary point. A user inputs a command by using a touch or a hovering event on the displayed application. The command includes a command to select displayed data (e.g., in a case of a text, a command to select or copy a portion of the text). The controller 110 detects an input of the command and grasps a point where the command is input, while the application is displayed on the screen 120. The controller 110 may grasp a size of the generated popup window and display the generated popup window in an area other than the point where the input has been detected, so as to prevent the generated popup window from being displayed at the input detection point.

The controller 110 may display the popup window together with the application on the screen. The controller 110 may simultaneously display the popup window and the application on the screen 120. The controller 110 may translucently or opaquely display the popup window on the displayed application. The controller 110 may translucently display data of the displayed application corresponding to an area of the displayed popup window or may display the data in the remaining area other than the area of the popup window. Further, the data of the application corresponding to the area where the popup window is displayed may be hidden by the popup window, in which case the controller 110 may control at least one of the application and the screen 120 such that the data hidden by the display area of the popup window is displayed in the remaining area other than the area where the popup window is displayed. For example, the controller 110 may display the data of the application on an upper, lower, left, or right side of the popup window. When the displayed application corresponds to news or a newspaper article based on a text, the controller 110 extracts the displayed text and displays the extracted text on a lower, upper, left, or right side of the popup window. A display location of the text may be adaptively determined corresponding to at least one of location movement and size adjustment of the popup window. When the popup window is displayed while the application is being displayed, data of the displayed application corresponding to an area of the displayed popup window may be hidden, in which case the controller 110 may simultaneously display the popup window and the data in the same area, by adjusting transparency of the popup window and the corresponding data of the application hidden by the popup window to translucency. The transparency may be adjusted by the controller 110 to a degree that can be recognized by a user.

The controller 110 changes an attribute of at least one of the popup window and an area of the application corresponding to the area of the popup window in response to a command to control the popup window. The attribute of the displayed popup window may be changed by at least one of size enlargement, size reduction, and location movement. The attribute of the area of the application corresponding to the area of the popup window may be changed in correspondence to the changed attribute of the popup window. When the command corresponds to a command to enlarge a size of the popup window, the controller 110 enlarges the size of the popup window. In this case, the enlarged popup window may include information included in the popup window displayed corresponding to reception of an event and additional information of a user having transmitted the event. The additional information may include a sender's personal information (e.g., a sender's birthday, information on a schedule by appointment with a sender, and the like). When the event is received from the sender, the user may be reminded of memories for the sender, and the additional information may include information useful for reminding the user of the memories. As described above, the controller 110 may include at least one piece of information in the popup window in correspondence to the enlargement of the popup window.

The controller 110 may translucently display data of the displayed application corresponding to an area of the enlarged popup window or may display the data in the remaining area other than the area of the enlarged popup window. The controller 110 may translucently or opaquely display the enlarged and/or moved popup window on the displayed application. Further, the controller 110 may translucently display the data of the displayed application corresponding to the area of the enlarged and/or moved popup window or may display the data in the remaining area other than the area of the enlarged and/or moved popup window. Further, the data of the application corresponding to the area where the enlarged and/or moved popup window is displayed may be hidden by the popup window, in which case the controller 110 may control at least one of the application and the screen 120 such that the data hidden by the display area of the popup window is displayed in the remaining area other than the area where the enlarged and/or moved popup window is displayed. For example, the controller 110 may display the data of the application on an upper, lower, left, or right side of the enlarged and/or moved popup window. When the displayed application corresponds to news or a newspaper article based on a text, the controller 110 may extract the displayed text and may display the extracted text on a lower, upper, left, or right side of the popup window. A display location of the text may be adaptively determined corresponding to at least one of location movement and size adjustment of the popup window. The screen 120 receives at least one touch through a user's body (e.g., the fingers) or a touchable input unit (e.g., a stylus pen or an electronic pen). Further, the screen 120 includes the hovering recognition device 121 and the touch recognition device 122 which can properly recognize an input according to an input method when the input is made through a pen such as a stylus pen or an electronic pen. The hovering recognition device 121 may determine a distance between the pen and the screen 120 through a magnetic field, an ultrasonic wave, optical information, or a surface acoustic wave, and the touch recognition device 122 may detect a touched location by using electrical charge moved by a touch. The touch recognition device 122 may detect all touches that can generate static electricity and may also detect a touch by a finger or a pen which is an input unit. The screen 120 transmits an analog signal corresponding to at least one gesture to the screen controller 130.

In various embodiments of the present invention, the touch is not limited to contact between the screen 120 and a user's body or a touchable input unit, and may include non-contact (e.g., a detectable interval without the contact between the screen 120 and the user's body or the touchable input unit). The interval which can be detected by the screen 120 may be changed according to a capability or a structure of the electronic device 100, and, for example, the screen 120 is configured such that values detected by a touch event and a hovering event (e.g., including a voltage or current value as an analog value) may be differently output for separate detection of the touch event by the contact between the screen 120 and the user's body or the touchable input unit and the input event (e.g., the hovering event) in a contactless status. In addition, the screen 120 may differently output the detected value (e.g., a current value) according to a distance between a space where the hovering event is generated and the screen 120.

The hovering recognition device 121 or the touch recognition device 122 may be implemented, for example, in a resistive type, a capacitive type, an infrared type, or an acoustic wave type.

The hovering recognition device 121 is an ElectroMagnetic Resonance (EMR) type touch panel and may include an electromagnetic induction coil sensor having a grid structure in which a plurality of loop coils are arranged in a predetermined first direction and a second direction intersecting with the first direction and an electronic signal processor sequentially providing an alternating current signal having a predetermined frequency to each of the loop coils of the electromagnetic induction coil sensor. If an input unit including a resonance circuit therein exists in the vicinity of the loop coils of the hovering recognition device 121, a magnetic field transmitted from the corresponding loop coil generates a current based on mutual electromagnetic induction in the resonance circuit within the input unit. An induction magnetic field is generated, based on the current, from a coil that configures a resonance circuit within the input unit, the hovering recognition device 121 detects the induction magnetic field around the loop coil in a signal reception state to sense a hovering location or a touch location of the input unit and a height from the touch recognition device 122 to a pen point of the input unit.

The touch recognition device 122 is a capacitive touch panel in which a thin metal conductive material (e.g., an Indium Tin Oxide (ITO) film) is coated on opposite surfaces of glass such that a current flows on the glass surface and a dielectric substance capable of storing electrical charges is coated thereon. When the input unit (e.g., a user's finger or a pen) is touched on a surface of the touch recognition device 122, a predetermined amount of electric charge moves to a touched location due to static electricity, and the touch recognition device 122 detects the touched location through recognizing a variation in a current according to the movement of the electric charge. Through the touch recognition device 122, all touches that can generate static electricity may be detected and a touch by a finger or a pen which is an input unit may also be detected.

Further, the screen 120 may include at least two touch screen panels which can detect touches or approaches of the user's body and the touchable input unit in order to sequentially or simultaneously receive inputs by the user's body and the touchable input unit. The at least two touch screen panels provide different output values to the screen controller, and the screen controller may differently recognize the values input into the at least two touch screen panels to distinguish whether the input from the screen 120 is an input by the user's body or an input by the touchable input unit. The screen 120 may display at least one object or input text.

More specifically, the screen 120 may be formed in a structure in which a touch panel detecting an input by a finger or an input unit through a change in an induced electromotive force and a panel detecting contact of a finger or an input unit on the screen 120 are attached to each other or spaced apart from each other to be stacked in sequence. The screen 120 includes a plurality of pixels, and may display an image or handwriting input by an input unit or a finger through the pixels. The screen 120 may be a Liquid Crystal Display (LCD), an Organic Light Emitting Diode (OLED) display, or a Light Emitting Diode (LED) display.

Further, the screen 120 may include a plurality of sensors for determining a location of a finger or an input unit when the finger or the input unit contacts a surface of the screen 120 or is spaced a predetermined distance apart from the screen 120. Each of the plurality of sensors may be formed in a coil structure, and in a sensor layer formed of the plurality of sensors, the sensors may have preset patterns and may form a plurality of electrode lines. Due to the structure, when contact is generated on the screen 120 through a finger or an input unit, a detection signal of which a waveform is changed on account of capacity between the sensor layer and the input unit is generated, and the screen 120 may transmit the generated detection signal to the controller 10. The predetermined distance between the input unit and the hovering recognition device 121 may be determined through an intensity of a magnetic field formed by the coil.

The screen controller 130 converts an analog signal received by a text input to the screen 120 to a digital signal (e.g., X and Y coordinates), and transmits the digital signal to the controller 110. The controller 110 controls the screen 120 by using the digital signal received from the screen controller 130. For example, the controller 110 may allow a short-cut icon or an object displayed on the screen 120 to be selected or executed in response to a touch event or a hovering event. Further, the screen controller 130 may be included in the controller 110.

Further, the screen controller 130 identifies a distance between a space where a hovering event is generated and the screen 120 by detecting a value (e.g., a current value) output through the screen 120, and converts the identified distance value to a digital signal (e.g., a Z coordinate) to provide the digital signal to the controller 110.

The communication unit 140 may include a mobile communication unit, a sub-communication unit, a wireless LAN unit, and a short distance communication unit according to a communication method, a transmission distance, and the type of transmitted/received data. The mobile communication unit allows the electronic device 100 to be connected with an external device through mobile communication using at least one antenna (one or a plurality of antennas) under the control of the controller 110. The mobile communication unit may transmit/receive a wireless signal for a voice call, a video call, a text message (SMS), or a multimedia message (MMS) to/from a cellular phone of which the phone number is input to the electronic device 100, a smart phone, a tablet PC, or other devices. The sub-communication unit may include at least one of the wireless LAN unit and the short distance communication unit. For example, the sub-communication unit may include only the wireless LAN unit or only the short distance communication unit. Alternatively, the sub-communication unit may include both the wireless LAN unit and the short distance communication unit. Further, the sub-communication unit may transmit/receive a control signal to/from an input unit. The control signal transmitted/received between the electronic device 100 and the input unit may include at least one of a field for supplying electrical power to the input unit, a field for detecting a touch or hovering between the input unit and the screen 120, a field for detecting a push or an input of a button included in the input unit, an identifier of the input unit, and a field for representing X and Y coordinates where the input unit is located. Further, the input unit may transmit, to the electronic device 100, a feedback signal for the control signal received from the electronic device 100. The wireless LAN unit may access the Internet under the control of the controller 110 in a place where a wireless Access Point (AP) is installed. The wireless LAN unit supports a wireless LAN protocol (IEEE 802.11x) of the Institute of Electrical and Electronics Engineers (IEEE). The short distance communication unit may wirelessly perform short distance communication between the electronic device 100 and an image forming apparatus (not illustrated) under the control of the controller 110. A short distance communication scheme may include Bluetooth, Infrared Data Association (IrDA) communication, WiFi-Direct communication, Near Field Communication (NFC) and the like.

The controller 110 communicates with an adjacent communication device or a remotely located communication device through at least one of the sub-communication unit and the wireless LAN unit, controls reception of various data including an image, an emoticon, a photo, and the like through an internet network, and communicates with an input unit. Such communication may be made by using transmission/reception of a control signal.

The electronic device 100 may include at least one of the mobile communication unit, the wireless LAN unit, and the short distance communication unit according to a capacity thereof. The electronic device 100 may include combinations of the mobile communication unit, the wireless LAN unit, and the short distance communication unit according to a capacity thereof. In various embodiments of the present invention, at least one or combinations of the mobile communication unit, the wireless LAN unit, the screen, and the short distance communication unit are referred to as a transmission/reception unit. This does not reduce the scope of the present invention.

The input/output unit 150 includes at least one of a plurality of buttons, a microphone, a speaker, a vibration motor, a connector, a keypad, an earphone connecting jack, and an input unit. The input/output unit is not limited thereto, and a cursor control such as a mouse, a track ball, a joystick, or cursor direction keys may be provided to control cursor movement on the screen 120 through communication with the controller 110. In the input/output unit 150, the speaker may output a sound corresponding to control of at least one page displayed on the screen 120, and the vibration motor may also output a vibration corresponding to control of at least one page displayed on the screen 120.

The power supply unit 160 supplies electrical power to one battery or a plurality of batteries arranged in the housing of the electronic device 100 under the control of the controller 110. The one or more batteries supply electrical power to the electronic device 100. Further, the power supply unit 160 may supply, to the electronic device 100, electrical power input from an external power source through a wired cable connected to a connector. In addition, the power supply unit 160 may supply, to the electronic device 100, electrical power wirelessly input from the external power source through a wireless charging technology.

The storage unit 170 may stores a signal or data input/output corresponding to an operation of the communication unit 140, a multimedia unit, the screen 120, and the input/output unit 150 under the control of the controller 110. Further, the storage unit 170 stores a plurality of phone numbers and schedule information, and stores a control program for control of the electronic device 100 or the controller 110 and applications.

The storage unit 170 may include a nonvolatile memory, a volatile memory, a Hard Disk Drive (HDD), or a Solid State Drive (SSD).

Further, the storage unit 170 stores at least one of a character, a word, and a text input to the screen 120, and stores various data including a text, an image, an emoticon, an icon, and the like which a user receives through an Internet network. Moreover, the storage unit 170 stores various applications such as a navigation application, a video call application, a game application, a time-based alarm application, and the like; images for providing a Graphical User Interface (GUI) related to the applications; a database or data related to user information, documents and methods for processing a touch-input; background images (e.g., a menu screen, a standby screen, etc.) or operating programs required for operating the electronic device 100; and images photographed by a camera unit of the electronic device. The storage unit 170 may be a machine (e.g., a computer)-readable medium, and the term "machine-readable medium" may be defined as a medium for providing data to the machine such that the machine may perform a specific function. The machine-readable medium may be a storage medium. The storage unit 170 includes a nonvolatile medium and a volatile medium. All of these media should be a type that allows the commands transferred by the media to be detected by a physical instrument into which the machine reads the commands.

Figure 2:
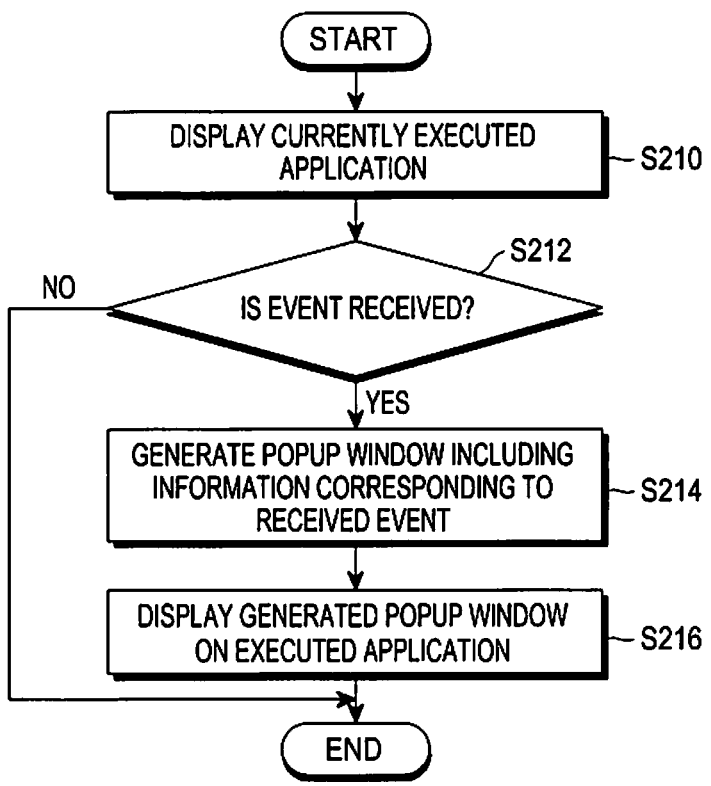
FIG. 2 is a flowchart illustrating a method of controlling a screen of an electronic device according to an embodiment of the present invention.

FIG. 2 is a flowchart illustrating a method of controlling a screen of an electronic device according to an embodiment of the present invention.

A screen 120 displays a currently executed application, in step S210. The controller 110 displays the application selected or pre-designated by a user on the screen 120. The application includes predetermined data, and the predetermined data may be displayed on the screen 120. The predetermined data may be different according to a type of application. A location where the predetermined data is displayed may be adjusted by the controller 110.

When it is determined in step S212 that an event has been received, the controller 110 generates a popup window including information corresponding to the received event, in step S214. The event may include at least one of a voice call, a video call and a text message. The present invention may also be applied to a case of receiving an event irrespective of a user's intention while the user performs a task through the application, in addition to the voice call, the video call and the text message.

The generated popup window may include information on a user having transmitted the event. For example, as described above, when the event corresponds to the voice call, the information included in the generated popup window may include at least one of a sender's name, a sender's phone number, a reception menu for starting the call, a speaker menu for starting the call through a speaker, a rejection message menu for transmitting a message to a sender to inform of a status of not receiving the call, and a rejecting menu for rejecting the call. When the event corresponds to the text message, the information included in the popup window may include at least one of a sender's name, a sender's photo, a sender's phone number, a reply menu for transmitting a reply to the received text, a view menu for viewing the received text, a deletion menu for deleting the received text, and a cancel menu for viewing the received text later.

As described above, an attribute of the generated popup window may be changed in response to at least one command of size enlargement, size reduction, and location movement. When the command corresponds to a command to enlarge a size of the popup window, the controller 110 may enlarge the size of the popup window and may include, in the enlarged popup window, personal information (e.g., a sender's birthday, information on a schedule by appointment with the sender, and the like) of the user having transmitted the event as well as the aforementioned information basically provided. When the event is received from the sender, the user of an electronic device 100 may be reminded of a memory for the sender through the additional information. When the command corresponds to a command to move a location of the popup window, the controller 110 may move the location of the popup window.

The controller 110 displays the popup window generated in step S214 on the executed application, in step S216. As described, above, the controller 110 displays the generated popup window on an upper layer or a lower layer of the currently executed application while the popup window overlaps the application. The controller 110 may display the currently executed application and the generated popup window simultaneously or all together on the screen 120. The controller 110 may translucently or opaquely display the popup window on the displayed application. Further, the controller 110 may translucently display the data of the displayed application which may be hidden by the displayed popup window, or may display the data in the remaining area other than an area of the popup window. As described above, the controller 110 may adjust the display location of the data of the displayed application corresponding to the popup window. For example, when the popup window is opaquely displayed, the controller 110 may display the data of the displayed application corresponding to the area of the displayed popup window in the remaining area other than the area of the popup window.

Figure 3:
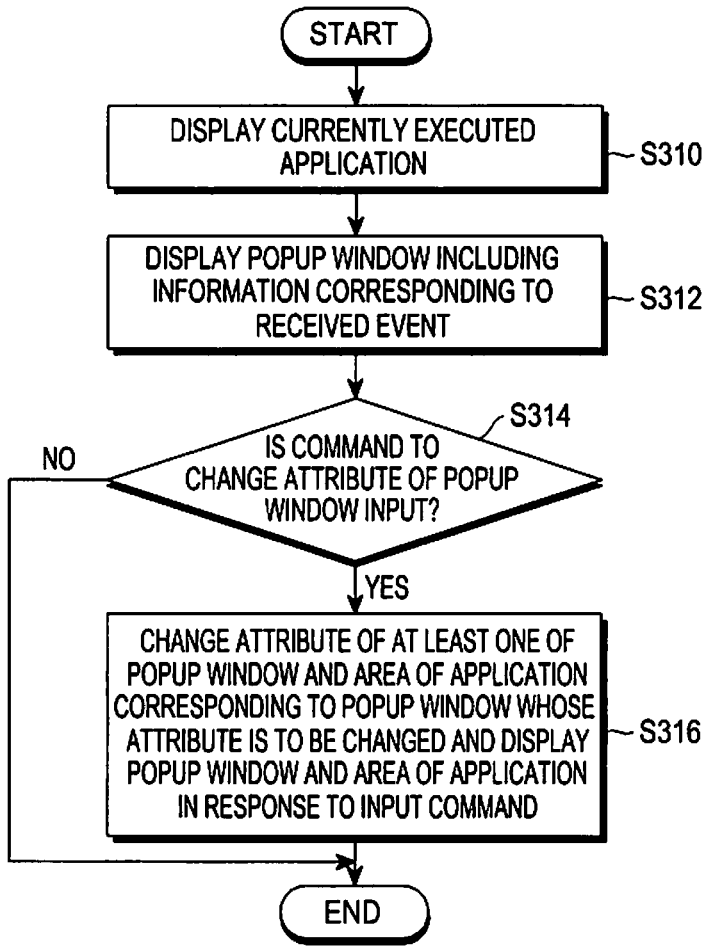
FIG. 3 is a flowchart illustrating a method of controlling a screen of an electronic device according to another embodiment of the present invention.

FIG. 3 is a flowchart illustrating a method of controlling a screen of an electronic device according to another embodiment of the present disclosure.

A screen 120 displays a currently executed application, in step S310. A controller 110 displays an application selected or pre-designated by a user on the screen 120. The application includes predetermined data, and the predetermined data may be displayed on the screen 120. A location where the predetermined data is displayed may be adjusted by the controller 110. The application may include a text based application.

The controller 110 displays a popup window including information corresponding to the received event on the screen 120, in step S312. The event may include at least one of a voice call, a video call and a text message. The information included in the popup window may be different according to a type of event. The controller 110 may simultaneously display the application and the popup window on the screen 120. Further, the controller 110 may display the popup window on the application while the popup window overlaps the application. The controller 110 may translucently display the popup window on the application, or may translucently display the data of the application corresponding to an area where the popup window is displayed. Further, the controller 110 may opaquely display the popup window on the application, and at this time, may display the data of the application corresponding to the area of the opaquely displayed popup window in the remaining area other than the area of the popup window. The controller 110 may display the data of the application on an upper, lower, left, or right side of the popup window. The location where the data of the application is displayed may be changed according to translucency or opacity of the popup window.

When it is determined in step S314 that a command to change an attribute of the popup window has been input, the controller 110 changes an attribute of at least one of the popup window and the area of the application corresponding to the popup window of which the attribute is to be changed and displays the popup window and the application in response to the input command, in step S316. The command may include at least one of size enlargement, size reduction, and location movement. Further, the command may include a command to allow the opaquely displayed popup window to be translucently or transparently displayed. At least two of the size enlargement, the size reduction, and the location movement may be simultaneously performed. The controller 110 may change the attribute of the displayed popup window and may change the attribute of the application in correspondence to the changed attribute of the popup window, when the command is input. The controller 110 may change an attribute of at least one of the popup window and the area of the application corresponding to the area of the popup window in response to a command to control the attribute of the popup window.

If the command corresponds to a command to enlarge a size of the popup window, the controller 110 enlarges the size of the popup window. Further, the controller 110 may include, in the enlarged popup window, at least one piece of information included in the popup window displayed in step S312 and additional information of a user having transmitted the event. The additional information may differ according to the received event. The additional information may include a sender's personal information (e.g., a sender's birthday, information on a schedule by appointment with a sender, and the like). For example, when the received event corresponds to a voice call, the additional information may include information stored by a user, such as a date and time when the latest call has been made and a date, time, and a place for meeting by appointment with the user having transmitted the event. Further, when the received event corresponds to a text message, the additional information may include information stored by the user, such as contents of a recently transmitted/received text and a date, time, and a place for meeting by appointment with the user having transmitted the event. The controller 110 may extract the information on the user having transmitted the event from a storage unit 170 in response to the received event, and may generate and display the popup window. The additional information may include information to help the user be reminded of a memory for the user having transmitted the event in response to the event reception.

The controller 110 may translucently display data of the application corresponding to an area of the enlarged popup window or may display the data in the remaining area other than the area of the enlarged popup window. If the command corresponds to a command to move a location of the popup window, the controller 110 moves the location of the popup window, and translucently displays data of the displayed application corresponding to an area of the moved popup window, or displays the data in the remaining area other than the area of the moved popup window.

When the event received in step S312 corresponds to a voice call and a command to perform the voice call through a speaker is input, the controller 110 may cancel or remove the displayed popup window and may perform the voice call while displaying the application. In this case, the displayed application may provide, to the user, various functions that may be performed before the user receives the voice call. Further, when an input by at least one of a touch and hovering at an arbitrary point on the displayed application is detected, the controller 110 displays the popup window displayed in response to the event reception at another point or area other than the arbitrary point.

FIGS. 4A to 4H are screen views illustrating examples of a process of controlling a screen of an electronic device according to an embodiment of the present invention.

Although a voice call is received as an event in FIGS. 4A to 4H, this is only an embodiment and the present invention may also be applied to at least one of a video call and a text message in addition to the voice call. Hereinafter, a case in which an event corresponding to the voice call according to the embodiment of the present invention is received will be described.

Figure 4A:
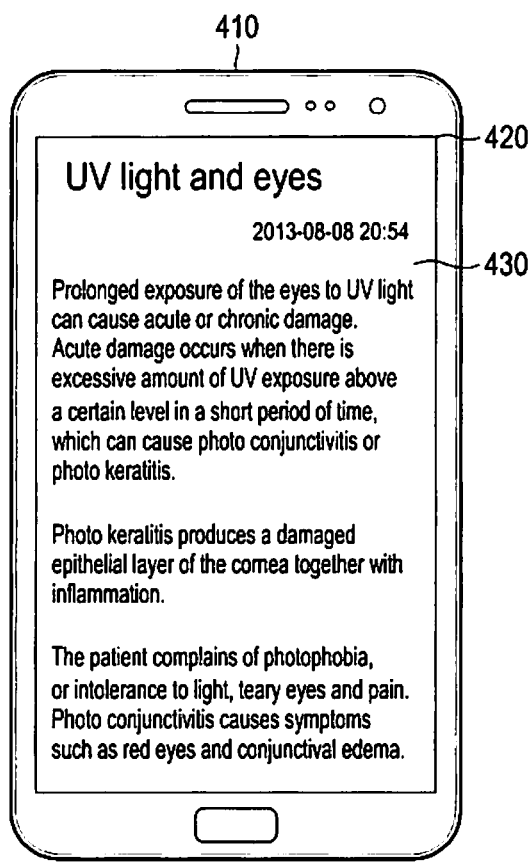
FIG. 4A is a screen view illustrating an example of a state in which an application according to an embodiment of the present invention is displayed.

FIG. 4A is a screen view illustrating an example of a state in which an application according to an embodiment of the present invention is displayed.

Referring to FIG. 4A, an electronic device 410 displays an application 430 on a screen 420. Such an application may be diverse, and may be selected or pre-designated by a user. Although a text based newspaper article is displayed in FIG. 4A, this is only an embodiment, and various embodiments of the present invention may also be applied to various applications, of which data may be changed in attribute, besides the newspaper article.

Figure 4B:
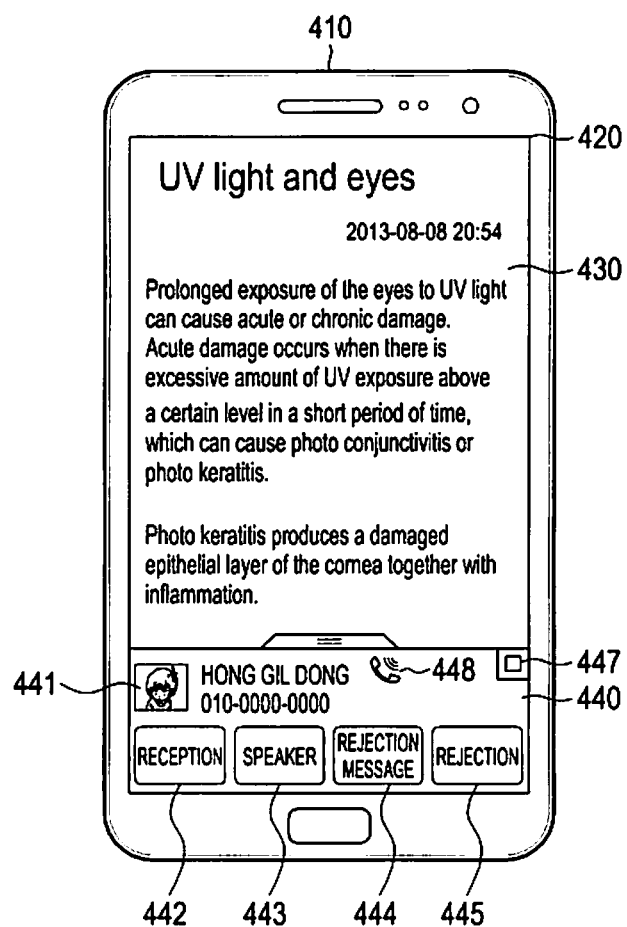
FIG. 4B is a screen view illustrating an example in which a popup window is displayed in response to reception of an event while an application according to an embodiment of the present invention is displayed.

FIG. 4B is a screen view illustrating an example in which a popup window is displayed in response to reception of an event while an application according to an embodiment of the present invention is displayed.

Figure 4C:
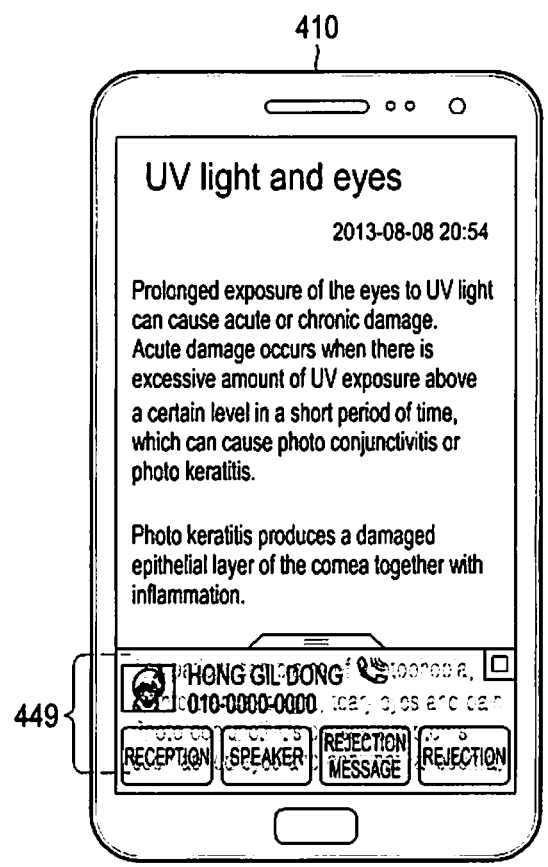
FIG. 4C is a screen view illustrating another example in which a popup window is displayed in response to reception of an event while an application according to an embodiment of the present invention is displayed.

FIG. 4C is a screen view illustrating another example in which a popup window is displayed in response to reception of an event while an application according to an embodiment of the present invention is displayed.

Referring to FIGS. 4B and 4C, the electronic device 410 displays the application 430 and a popup window 440 corresponding to a received event on the screen 420. The popup window 440 may differ according to a type of event, and may be opaquely displayed on the application 430 to block out a portion of application 430 while overlapping with the application 430 as illustrated in FIG. 4B. Further, as illustrated in FIG. 4C, the popup window 440 may be translucently displayed on the application 430, while overlapping with the application, in which case data 449 displayed in a corresponding area of the application overlapping with an area of the popup window may be translucently displayed. The user may simultaneously identify the popup window 440 and the data 449 in the overlapping area. When the popup window is opaquely displayed as described above with regard to FIG. 4B, some data of the application displayed in FIG. 4A may be hidden by the opaquely displayed popup window. For example, when the event corresponds to a voice call, the popup window 440 includes at least one of information such as a name, a photo 441, and a phone number of a sender having transmitted the event, a reception menu 442 for starting the call, a speaker menu 443 for starting the call through a speaker, a rejection message menu 444 for transmitting a message to the sender to inform the sender of a status of not receiving the call, and a rejection menu 445 for rejecting the call. Further, the popup window 440 may include an icon 448 showing that the call is currently being received. Among the aforementioned information, the name and the photo of the sender is information extracted in a state of having been stored in advance by the user. The remaining information may be basically provided from a manufacturer of the electronic device or a communication company. Further, the popup window 440 may be provided with an attribute changing menu 447 for changing an attribute of the popup window, and a location of the popup window may be changed or a size of the popup window may be adjusted through the attribute changing menu 447. However, changing the attribute of the popup window through the attribute changing menu 447 is only an embodiment, and the attribute of the popup window may also be changed through at least one of a touch and a hovering event input to any area of the popup widow 440. For example, through touching an arbitrary point of the popup window 440 and performing a drag, the location of the popup window may be changed or the size of the popup window may be adjusted.

Figure 4D:
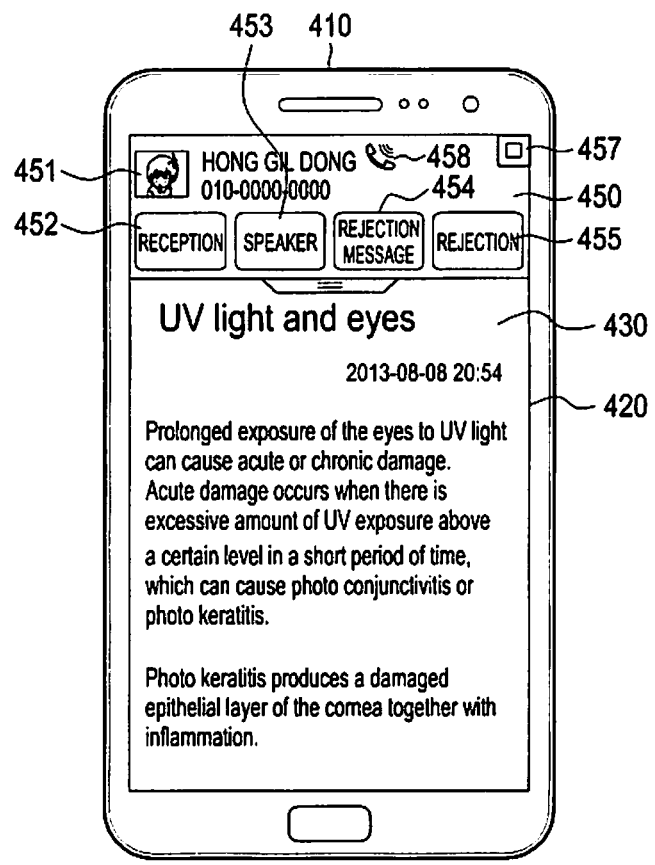
FIG. 4D is a screen view illustrating an example in which an attribute to change a location of a displayed popup window is applied while an application according to an embodiment of the present invention is displayed.

FIG. 4D is a screen view illustrating an example in which an attribute to change a location of a displayed popup window is applied while an application according to an embodiment of the present invention is displayed.

Figure 4E:
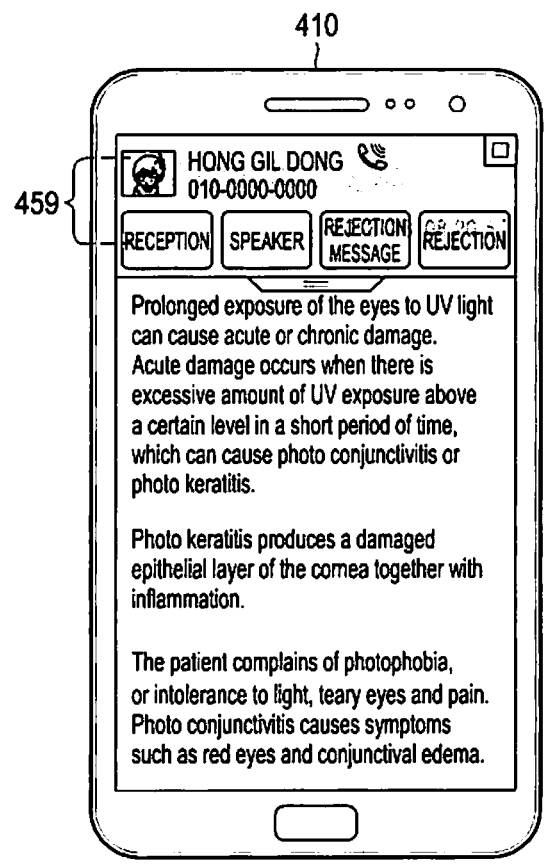
FIG. 4E is a screen view illustrating another example in which an attribute to change a location of a displayed popup window is applied while an application according to an embodiment of the present invention is displayed.

FIG. 4E is a screen view illustrating another example in which an attribute to change a location of a displayed popup window is applied while an application according to an embodiment of the present invention is displayed.

Referring to FIGS. 4D and 4E, the electronic device 410 displays an application 430 and a popup window 450 corresponding to a received event on the screen 420. Information included in the popup window 450 displayed in FIG. 4D may be the same as that included in the popup window 440 displayed in FIG. 4B. For example, when the event corresponds to a voice call, a user may identify a sender through a name, a photo 451, and a phone number of the sender, which are included in the popup window. Based on the identification result, the user of the electronic device 410 may select a reception menu 452 when wanting to make a call with the sender, may select a speaker menu 453 when wanting to start the call through a speaker, may select a desired message through a rejection message menu 454 when wanting to inform of a state of not being able to receive the call, or may select a rejection menu 455 when wanting to reject the call. Further, a location of the popup window may be changed or a size of the popup window may be adjusted through an attribute changing menu 457. Alternatively, at least one of size adjustment and location change of the popup window may be performed through the attribute changing menu 457. As illustrated in FIG. 4D, data corresponding to an area of the displayed application which may be hidden by the popup window 450 may be displayed on a lower side of the popup window 450. Further, as illustrated in FIG. 4E, the popup window 450 may be translucently displayed on the application, while overlapping the application, in which case data 459 displayed in a corresponding area of the application overlapping an area of the popup window may be translucently displayed. The user may simultaneously identify the information in the popup window 450 and the data 459 in the overlapping area.

Figure 4F:
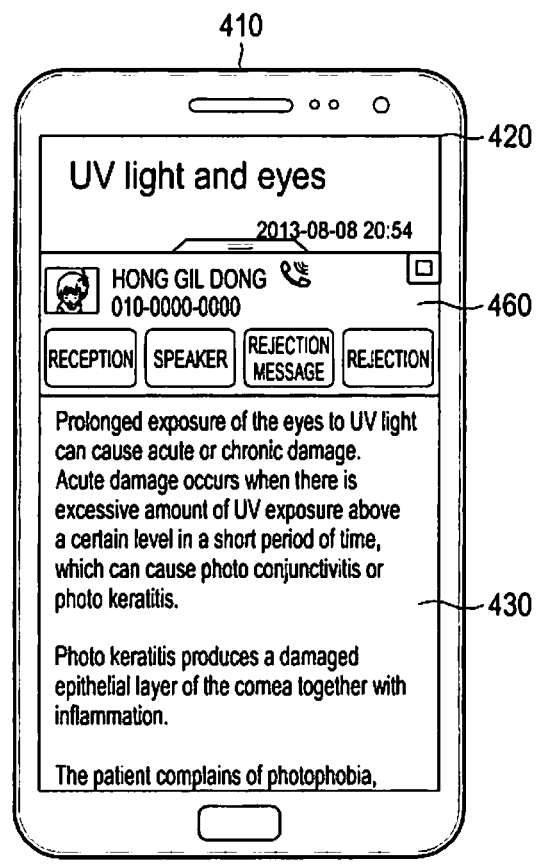
FIG. 4F is a screen view illustrating another example in which an attribute to change a location of a displayed popup window is applied while an application according to an embodiment of the present invention is displayed.

FIG. 4F is a screen view illustrating another example in which an attribute to change a location of a displayed popup window is applied while an application according to an embodiment of the present invention is displayed.

Figure 4G:
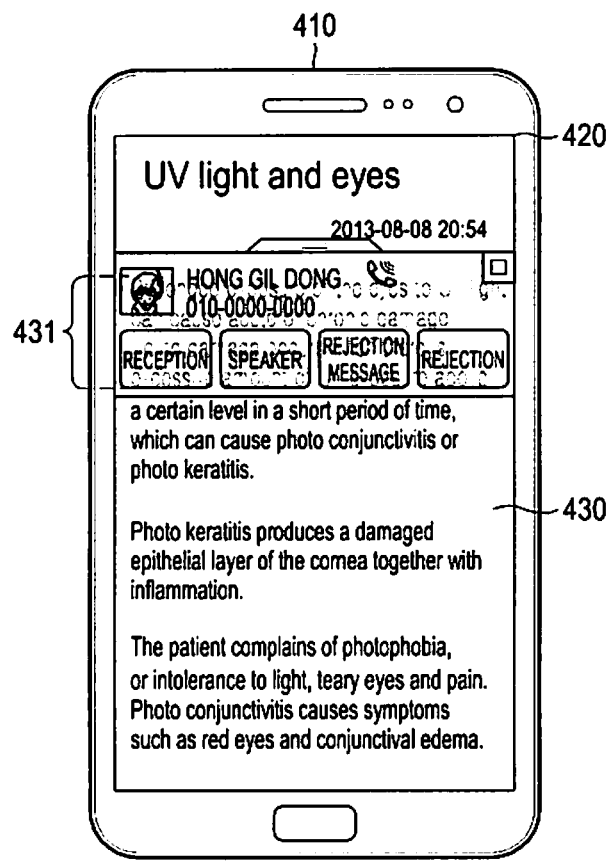
FIG. 4G is a screen view illustrating another example in which an attribute to change a location of a displayed popup window is applied while an application according to an embodiment of the present invention is displayed.

FIG. 4G is a screen view illustrating another example in which an attribute to change a location of a displayed popup window is applied while an application according to an embodiment of the present invention is displayed.

Referring to FIGS. 4F and 4G, the electronic device 410 displays an application 430 and a popup window 460 corresponding to a received event on the screen 420. Information included in the popup window 460 displayed in FIG. 4F may be the same as that included in the popup window 440 of FIG. 4B and that included in the popup window 450 of FIG. 4D. As illustrated in FIG. 4F, data corresponding to an area of the displayed application 430 which may be hidden by the popup window 460 may be displayed in the remaining area other than the area corresponding to the popup window 450. Further, as illustrated in FIG. 4G, the popup window 460 may be translucently displayed on the application 430, while overlapping the application, in which case data 431 displayed in a corresponding area of the application overlapping an area of the popup window may be translucently displayed. The user may simultaneously identify the information in the popup window 460 and the data 431 in the overlapping area.

Figure 4H:
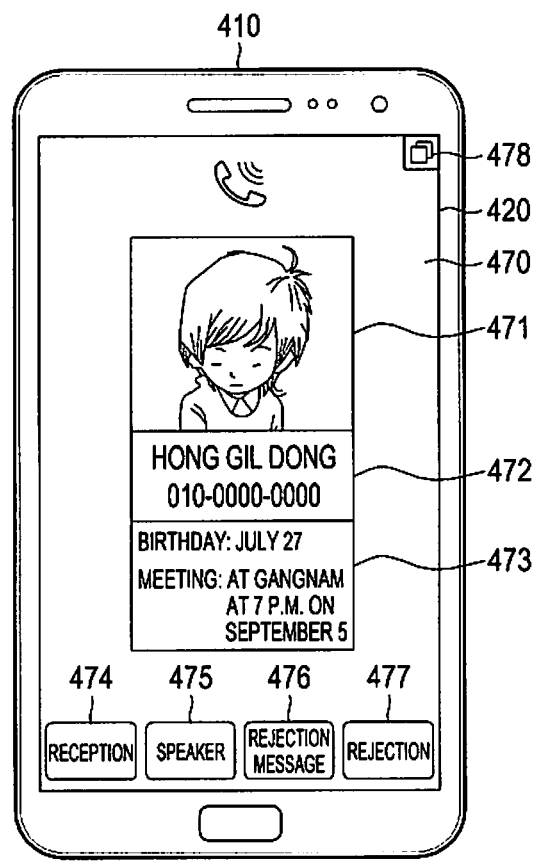
FIG. 4H is a screen view illustrating an example in which an attribute to maximize a size of a popup window according to an embodiment of the present invention is applied.

FIG. 4H is a screen view illustrating an example in which an attribute to maximize a size of a popup window according to an embodiment of the present invention is applied.

Referring to FIG. 4H, the electronic device 410 may enlarge a popup window 470 and display the enlarged popup window on the screen 420. In order to enlarge the popup window to the maximum as illustrated, the controller 110 may maximally enlarge the popup window through the attribute changing menu 447 and 457 in FIGS. 4B to 4G, respectively, or a drag using a touch or a hovering event input by a user. The shape of the attribute changing menus 447 and 457 in FIGS. 4B and 4G may be different from that of an attribute changing menu 478 in FIG. 4H. The user may determine through the different shapes of the attribute changing menus whether a size of the current popup window is at the maximum or whether the popup window may be further enlarged. Information included in the popup window 470 displayed on the screen 420 may include a sender's photo 471, sender's name and phone number 472, a reception menu 474, a speaker menu 475, a rejection message menu 476, and a rejection menu 477. Further, as described above, the popup window 470 may include a sender's additional information 473 in addition to the information included in the popup windows of FIGS. 4B to 4G. For example, when a size of the popup window 470 of FIG. 4H is larger than that of the popup windows 440, 450 and 460 of FIGS. 4B to 4G, the controller 110 may include, in the popup window 470, the sender's additional information 473 in addition to the information included in the popup windows 440, 450 and 460 of FIGS. 4B to 4G. The additional information 473 may be personal information of the sender and previously appointment information for the sender. For example, the additional information may include a sender's personal information (e.g., a sender's birthday, information on a schedule by appointment with a sender, and the like). When an event is received from the sender, the user may be reminded of an appointment with the sender through the additional information 473. When a call is received as illustrated in FIG. 4H, before starting the call, the user may recognize that the sender's birthday is on July 27 and he has promised to meet with the sender at Gangnam at 7 P.M. on September 5. Although the additional information is displayed at a lower side of the sender's photo 471 in FIG. 4H, this is only an embodiment and the additional information may be displayed in any area on the screen 420. The controller 110 may include at least one piece of information in the popup window corresponding to the enlarged popup window.

Figure 5A:
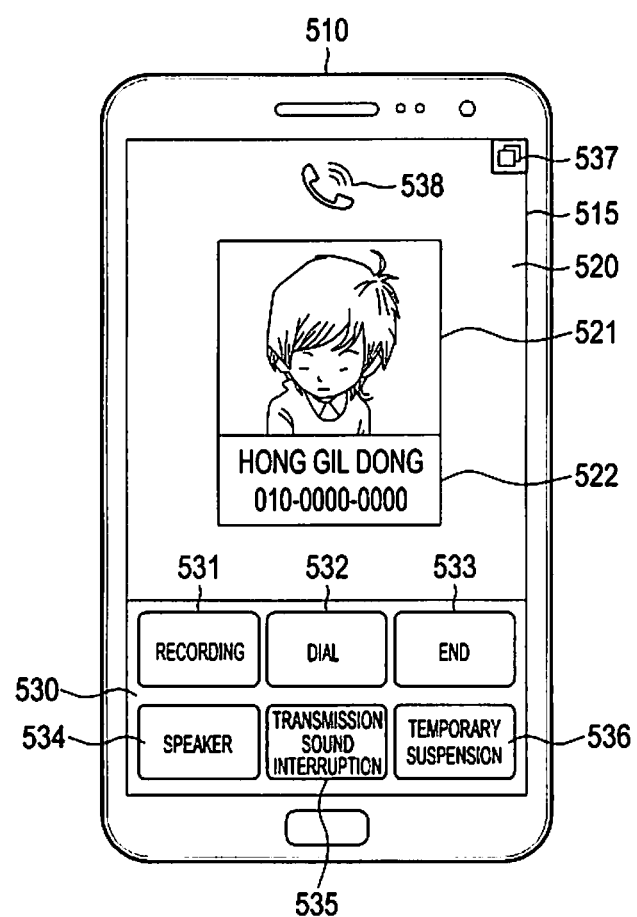
FIG. 5A is a screen view illustrating an example in which a popup window is displayed during a voice call while an application according to an embodiment of the present invention is being displayed.
Figure 5B:
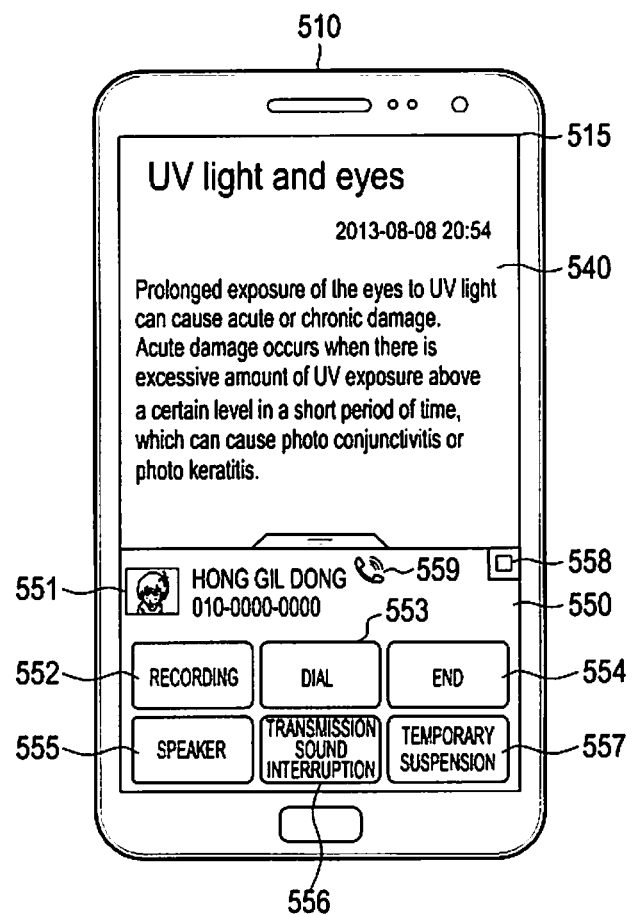
FIG. 5B is a screen view illustrating another example in which a popup window is displayed during a voice call while an application according to an embodiment of the present invention is being displayed.
Figure 5C:
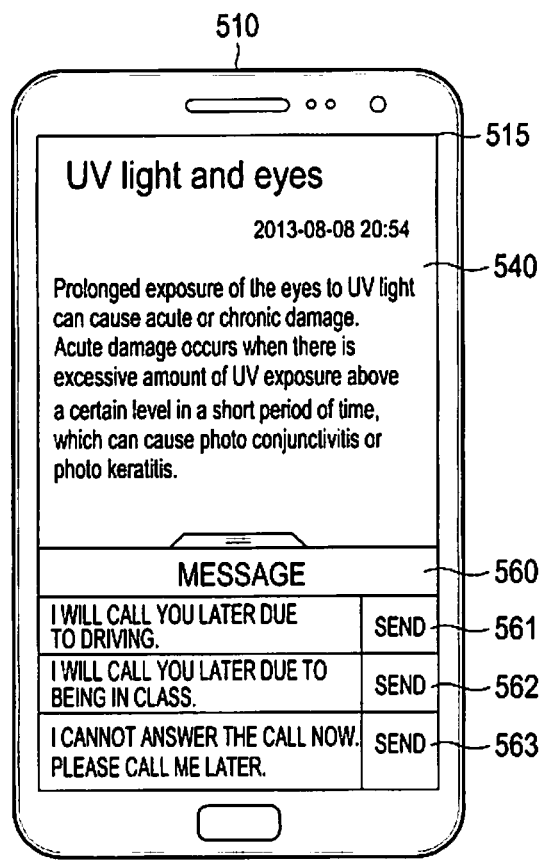
FIG. 5C is a screen view illustrating an example of a selection result of a rejection message menu in a popup window while an application according to an embodiment of the present invention is being displayed.

FIGS. 5A to 5C illustrate various examples of controlling a call in a popup window displayed in response to call reception while an application according to an embodiment of the present invention is being displayed.

FIG. 5A is a screen view illustrating an example in which a popup window is displayed during a voice call while an application according to an embodiment of the present invention is being displayed.

Referring to FIG. 5A, when an event is received while an application 540 is being displayed, an electronic device 510 according to an embodiment of the present invention displays a popup window 530 corresponding to the received event. When a reception menu for starting a voice call is selected through the displayed popup window 530, the popup window 520 may be displayed on the whole screen 515, as shown in FIG. 5A. The popup window 520 includes at least one piece of information, such as a sender's photo 521, and a sender's name and phone number 522. Further, the popup window 530 may include at least one of a recording menu 531 for recording a voice during the call, a dial menu 532 for displaying a keypad during the call, an ending menu 533 for ending the call, a speaker menu 534 for performing the call through a speaker, a transmission sound interrupting menu 535 for interrupting a transmission sound, and a temporary suspension menu 536 for temporarily suspending the call. Further, the popup window 520 may include additional information on a user and an attribute changing menu 537. At least one of a size and a location of the popup window 520 may be changed or adjusted through the attribute changing menu. Although the popup window is displayed on the whole screen 515 in FIG. 5A, this is only an embodiment. In other embodiments of the present invention, the popup window 520 may be displayed on the screen while being decreased in size and a display location of the popup window may be adjusted. The application may be displayed on a lower layer of the popup window 520.

FIG. 5B is a screen view illustrating another example in which a popup window is displayed during a voice call while an application according to an embodiment of the present invention is being displayed.

Referring to FIG. 5B, an electronic device 510 according to an embodiment of the present invention may display a popup window 550 during a voice call while displaying an application 540 on a screen 515. The popup window 550 may perform at least one of size enlargement, size reduction, and location movement through an attribute changing menu 558. The popup window 550 of which the attribute has been changed may include a sender's photo 551 and a sender's name and phone number and may include at least one of a recording menu 552 for recording a voice during the call, a dial menu 553 for displaying a keypad during the call, an ending menu 554 for ending the call, a speaker menu 555 for performing the call through a speaker, a transmission sound interrupting menu 556 for interrupting a transmission sound, and a temporary suspension menu 557 for temporarily suspending the call. Further, the popup window 550 may be moved to a point or an area on the screen 515, may be enlarged or reduced, and may be translucently displayed as illustrated in FIGS. 4B to 4G When the popup window 550 is translucently displayed, an area of the application 540 corresponding to the popup window 550 may also be translucently displayed.

FIG. 5C is a screen view illustrating an example of a selection result of a rejection message menu in a popup window while an application according to an embodiment of the present invention is being displayed.

Referring to FIG. 5C, an electronic device 510 according to an embodiment of the present invention may display a popup window 560 for receiving a selection of various rejection messages in response to a selection of a rejection message menu in a popup window, while displaying an application 540. The popup window 560 includes information representing various situations so as to transmit a text message informing the sender that a call cannot be made now to the sender, when the call is received. For example, when a user wants to transmit a text message "I will call you later due to driving.", if the user selects a first menu 561, a controller 110 transmits the text message including this situation to a sender. Further, when the user wants to transmit a text message "I will call you later due to being in class.", if the user selects a second menu 562, the controller 110 transmits the text message including this situation to the sender. Moreover, when the user wants to transmit a text message "I cannot answer the call now. Please call me later.", if the user selects a third menu 563, the controller 110 transmits the text message including this situation to the sender. The popup window 560 may include information representing other various situations as well as the aforementioned situations, and a user may directly add contents to be transmitted. The popup window 560 may be moved to another point or an area on the screen 515, may be enlarged or reduced, and may be translucently displayed as illustrated in FIGS. 4B to 4G. When the popup window 560 is translucently displayed, an area of the application 540 corresponding to the popup window 560 may also be translucently displayed.

As described above, the present invention provides an electronic device and a method for controlling a screen, which can provide effective multi-tasking to users.

Further, according to an embodiment of the present invention, an executed application is displayed on a screen and when reception of an event is detected, a popup window including at least one piece of information corresponding to the received event is displayed on the displayed application, whereby users can simultaneously perform a task before the reception of the event and a task corresponding to the event.

Furthermore, according to another embodiment of the present invention, an executed application is displayed on a screen, a popup window including at least one piece of information is generated in response to reception of an event, and the generated popup window is displayed on the displayed application, whereby personal information of a user having transmitted the event can be grasped before the event is accepted. Moreover, according to another embodiment of the present invention, a previous task in progress can be continuously performed even when a voice call is received, thereby providing more effective multi-tasking.

It will be appreciated that the embodiments of the present invention may be implemented in a form of hardware, software, or a combination of hardware and software. Any such software may be stored, for example, in a volatile or nonvolatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It is appreciated that the storage unit included in the electronic device is one example of a program including commands for implementing various embodiments of the present disclosure or a machine-readable storage medium suitable for storing programs. Therefore, embodiments of the present invention provide a program including codes for implementing a system or method claimed in any claim of the accompanying claims and a machine-readable device for storing such a program. Moreover, such a program as described above can be electronically transferred through an arbitrary medium such as a communication signal transferred through cable or wireless connection, and the present invention properly includes the things equivalent to that.

Further, the electronic device may receive the program from a program providing apparatus connected to the electronic device wirelessly or through a wire and store the received program. The program providing device may include a program including instructions allowing the electronic device to perform the method of controlling the screen, a memory for storing information required for the screen control method, a communication unit for performing wired or wireless communication with the electronic device, and a controller transmitting a corresponding program to the electronic device according to a request of the electronic device or automatically.

Meanwhile, although certain embodiments of the present invention have been described in the detailed description of the present invention, various modifications can be made without departing from the scope of the present invention. Therefore, the scope of the present invention should not be limited to the aforementioned embodiments, but should be defined by the equivalents to the appended claims as well as the claims.

What is claimed is:

1. An electronic device, comprising:
a touchscreen display, and
at least one processor, wherein the at least one processor is configured to:
display, on the touchscreen display, a first screen including an execution screen of a first application,
in response to an occurrence of an incoming call, display a notification of a first type indicating the occurrence of the incoming call on the execution screen of the first application, wherein at least part of the notification of the first type is displayed translucently while at least part of the execution screen of the first application is displayed on the touchscreen display,
receive a first user input for moving the notification of the first type,
in response to the reception of the first user input, display a notification of a second type on the first screen, wherein the notification of the second type is displayed opaquely, wherein a size of the notification of the second type is smaller than a size of the notification of the first type, and wherein the execution screen of the first application is not overlapped with the notification of the second type,
receive a second user input on the notification of the second type, and
in response to the reception of the second user input, display a second screen indicating the occurrence of the incoming call on the touchscreen display.

2. The electronic device of claim 1, wherein the notification of the first type includes at least one of a phone number of a sender, a first graphical object for starting the incoming call and a second graphical object for rejecting the incoming call.

3. The electronic device of claim 1, wherein the second screen includes at least one of at least one of a phone number of a sender, a first graphical object for starting the incoming call and a second graphical object for rejecting the incoming call.

4. The electronic device of claim 1, wherein information included in the notification of the first type and information included in the notification of the second type are at least partially different form each other.

5. A method for controlling an electronic device, comprising:
displaying, on a touchscreen display of the electronic device, a first screen including an execution screen of a first application,
in response to an occurrence of an incoming call, displaying a notification of a first type indicating the occurrence of the incoming call on the execution screen of the first application, wherein at least part of the notification of the first type is displayed translucently while at least part of the execution screen of the first application is displayed on the touchscreen display,
receiving a first user input for moving the notification of the first type,
in response to the reception of the first user input, displaying a notification of a second type on the first screen, wherein the notification of the second type is displayed opaquely, wherein a size of the notification of the second type is smaller than a size of the notification of the first type, and wherein the execution screen of the first application is not overlapped with the notification of the second type,
receiving a second user input on the notification of the second type, and
in response to the reception of the second user input, displaying a second screen indicating the occurrence of the incoming call on the touchscreen display.

6. The method of claim 5, wherein the notification of the first type includes at least one of a phone number of a sender, a first graphical object for starting the incoming call and a second graphical object for rejecting the incoming call.

7. The method of claim 5, wherein the second screen includes at least one of at least one of a phone number of a sender, a first graphical object for starting the incoming call and a second graphical object for rejecting the incoming call.

8. The method of claim 5, wherein information included in the notification of the first type and information included in the notification of the second type are at least partially different form each other.

9. An electronic device, comprising:
a touchscreen display, and
at least one processor, wherein the at least one processor is configured to:
display, on the touchscreen display, a first screen including an execution screen of a first application, wherein the execution screen of the first application includes a plurality of characters,
in response to an occurrence of an incoming call, display a notification of a first type indicating the occurrence of the incoming call on the execution screen of the first application, wherein at least part of the notification of the first type is displayed translucently while at least part of the execution screen of the first application is displayed on the touchscreen display, and wherein at least one character among the plurality of characters is displayed through the translucently displayed notification of the first type,
receive a first user input for moving the notification of the first type,
in response to the reception of the first user input, display a notification of a second type on the first screen, wherein a size of the notification of the second type is smaller than a size of the notification of the first type, and wherein the execution screen of the first application is not overlapped with the notification of the second type,
receive a second user input on the notification of the second type, and
in response to the reception of the second user input, display a second screen indicating the occurrence of the incoming call on the touchscreen display.

10. The electronic device of claim 9, wherein the notification of the first type includes at least one of a phone number of a sender, a first graphical object for starting the incoming call and a second graphical object for rejecting the incoming call.

11. The electronic device of claim 9, wherein the second screen includes at least one of at least one of a phone number of a sender, a first graphical object for starting the incoming call and a second graphical object for rejecting the incoming call.

12. The electronic device of claim 9, wherein information included in the notification of the first type and information included in the notification of the second type are at least partially different form each other.

* * * * *